United States Patent
Nakamichi et al.

(10) Patent No.: US 12,467,115 B2
(45) Date of Patent: *Nov. 11, 2025

(54) METHOD FOR PRODUCING BERYLLIUM SOLUTION, METHOD FOR PRODUCING BERYLLIUM, METHOD FOR PRODUCING BERYLLIUM HYDROXIDE, METHOD FOR PRODUCING BERYLLIUM OXIDE, AND BERYLLIUM OXIDE

(71) Applicants: NATIONAL INSTITUTES FOR QUANTUM SCIENCE AND TECHNOLOGY, Chiba (JP); KAKEN INC., Mito (JP)

(72) Inventors: Masaru Nakamichi, Chiba (JP); Jaehwan Kim, Chiba (JP); Yoshiaki Akatsu, Chiba (JP); Suguru Nakano, Chiba (JP); Tomohiko Kawakami, Mito (JP); Kazuo Yonehara, Mito (JP)

(73) Assignees: NATIONAL INSTITUTES FOR QUANTUM SCIENCE AND TECHNOLOGY, Chiba (JP); KAKEN INC., Mito (JP)

( * ) Notice: Subject to any disclaimer, the term of this patent is extended or adjusted under 35 U.S.C. 154(b) by 708 days.

This patent is subject to a terminal disclaimer.

(21) Appl. No.: 17/636,491

(22) PCT Filed: Aug. 27, 2020

(86) PCT No.: PCT/JP2020/032263
§ 371 (c)(1),
(2) Date: Feb. 18, 2022

(87) PCT Pub. No.: WO2021/039875
PCT Pub. Date: Mar. 4, 2021

(65) Prior Publication Data
US 2022/0298021 A1    Sep. 22, 2022

(30) Foreign Application Priority Data

Aug. 30, 2019  (JP) .................... 2019-158616

(51) Int. Cl.
*C01F 1/00*   (2006.01)
*C01F 3/02*   (2006.01)
*C22B 3/24*   (2006.01)

(52) U.S. Cl.
CPC .............. *C22B 3/24* (2013.01); *C01F 1/00* (2013.01); *C01F 3/02* (2013.01)

(58) Field of Classification Search
CPC ............... C22B 3/24; C01F 1/00; C01F 3/02
See application file for complete search history.

(56) References Cited

U.S. PATENT DOCUMENTS 1,511,829 A   10/1924  Dickinson
2,899,276 A   8/1959   Hutter et al.
(Continued)

FOREIGN PATENT DOCUMENTS

CN   103663506 A   3/2014
CN   105734282 A   7/2016
(Continued)

OTHER PUBLICATIONS

Zaki, et al. "Extraction equilibrium of beryllium and aluminum and recovery of beryllium from Egyptian beryl solution using CYANEX 921" Hydrometallurgy 80.4 (2005): 221-231 (Year: 2005).*
(Continued)

*Primary Examiner* — Anthony J Zimmer
*Assistant Examiner* — Eric Scott Sherman
(74) *Attorney, Agent, or Firm* — McCarter & English, LLP; David G. Conlin

(57) ABSTRACT

This invention has an object to provide a method for producing a beryllium solution by dissolving beryllium
(Continued)

oxide, the method being novel and having high energy efficiency. A production method (M10) for producing a beryllium solution includes a main heating step (S13) of dielectrically heating an acidic solution containing beryllium oxide to generate a beryllium solution.

10 Claims, 9 Drawing Sheets

(56) References Cited

U.S. PATENT DOCUMENTS

| | | | |
|---|---|---|---|
| 3,057,684 A * | 10/1962 | Pruvot | C01F 3/00 |
| | | | 423/624 |
| 3,669,649 A * | 6/1972 | Olson | C22B 35/00 |
| | | | 423/20 |
| 5,091,160 A | 2/1992 | Kondos et al. | |
| 2005/0280816 A1 | 12/2005 | Agrawal et al. | |
| 2007/0170393 A1 | 7/2007 | Zhang | |
| 2011/0182786 A1 | 7/2011 | Burba, III | |
| 2014/0314640 A1* | 10/2014 | Ospanov | C22B 35/00 |
| | | | 423/132 |
| 2015/0197826 A1 | 7/2015 | Burba | |
| 2019/0136340 A1 | 5/2019 | Burba, III | |

FOREIGN PATENT DOCUMENTS

| | | | | |
|---|---|---|---|---|
| CN | 105734309 A | | 7/2016 | |
| CN | 105907962 A | | 8/2016 | |
| CN | 106521192 A | | 3/2017 | |
| GB | 900698 | * | 7/1962 | C25C 3/34 |
| GB | 1080253 A | | 8/1967 | |
| GB | 1252081 A | | 11/1971 | |
| JP | s49-033757 B1 | | 9/1974 | |
| JP | 2003-073751 A | | 3/2003 | |
| JP | 2007-523096 A | | 8/2007 | |
| JP | 2012-088102 A | | 5/2012 | |
| JP | 2013-528696 A | | 7/2013 | |

OTHER PUBLICATIONS

Koop, Jacob. "A study of the hydrates of beryllium sulfate." (1950), University of Manitoba (Year: 1950).*
U.S. Appl. No. 17/636,474, filed Feb. 18, 2022, Pending.
Akizuki, Electron microscope observations on the crack planes of beryl and quartz. Journal of the Association for the Study of Rocks and Mineral Deposits. Sep. 5, 1965;54(3):77-86.
Graziani, Growth of a Beryl Single Crystal—History of the Development and the Genetic Medium. J Appl Cryst. 1981;14:241-246.
Parameshwaran, Dissolution Behaviour of Beryl. Genehmigte Dissertation. von der Fakultat VI-Planen Bauen Umwelt der Technischen Universitat Berlin zur Erlangung der akademischen Grades Doktor der Naturwissenschaften. 172 pages, (2016).
Shigley et al., Gem-bearing Pegmatites: A Review. Gems & Gemology. pp. 64-77, (1984).
Office Action for Japanese Patent Application No. 2021-542983, dated Nov. 7, 2023, with machine translation into English, 3 pages .
Wikipedia, Beryllium. Retrieved online at: https://en.wikipedia.org/w/index.php?title=Beryllium&oldid=1043595147. 23 pages, Sep. 10, 2021.
International Search Report and Written Opinion for Application No. PCT/JP2020/032263, dated Oct. 27, 2020, 14 pages.
International Search Report and Written Opinion for Application No. PCT/JP2020/032264, dated Oct. 27, 2020, 15 pages.
Stefaniak et al., Characteristics of Beryllium Oxide and Beryllium Metal Powders for Use as Reference Materials. Journal of ASTM International. Nov./Dec. 2005;2(10): 15 pages.
US Non-Final Office Action for U.S. Appl. No. 17/636,474, dated Mar. 20, 2025, 25 pages.
Japanese Office Action for Application No. 2024-039384, dated May 21, 2025, 3 pages.

* cited by examiner

| | SOLUTION AND HEATING CONDITION ||
| --- | --- | --- |
| | SOLUTION | HEATING |
| EXPERIMENT 1 | BASIC SOLUTION | WITHOUT (R.T.) |
| EXPERIMENT 2 | BASIC SOLUTION | MW |
| EXPERIMENT 3 | ACIDIC SOLUTION | WITHOUT (R.T.) |
| EXPERIMENT 4 | ACIDIC SOLUTION | MW |
| EXPERIMENT 5 | BASIC SOLUTION | WITHOUT (R.T.) |
| | ACIDIC SOLUTION | WITHOUT (R.T.) |
| EXPERIMENT 6 | BASIC SOLUTION | MW |
| | ACIDIC SOLUTION | MW |

FIG. 7

| | | Be-Al-Si-O, Be-Al-O (BERYL) | | | Be-Si-O (PHENACITE) | | |
|---|---|---|---|---|---|---|---|
| | | Be | Al | Si | Be | Al | Si |
| TREATMENT ONLY WITH ALKALINE SOLUTION | EXP.* 1 NaOH(R.T.) | 0.1 | 0.2 | 0.2 | 0.2 | 0.1 | 0.4 |
| | EXP.* 2 NaOH(MW) | 1.1 | 2.0 | 6.6 | 2.4 | 0.8 | 5.0 |
| TREATMENT ONLY WITH ACIDIC SOLUTION | EXP.* 3 HCl(R.T.) | 0.2 | 0.3 | 0.2 | 1.8 | 1.3 | 0.2 |
| | EXP.* 4 HCl(MW) | 0.3 | 0.4 | 0.2 | 15.2 | 1.4 | 0.1 |
| TREATMENT WITH ALKALINE SOLUTION, AND THEN WITH ACIDIC SOLUTION | EXP.* 5 NaOH(R.T.) + HCl(R.T.) | 0.2 | 0.5 | 0.4 | 1.8 | 1.2 | 2.7 |
| | EXP.* 6 NaOH(MW) + HCl(MW) | 3.1 | 6.3 | 0.5 | — | — | — |

*: "EXP." STANDS FOR "EXPERIMENT".

FIG. 8

|  |  |  | Be-Al-Si-O, Be-Al-O | | Be-Si-O | |
|---|---|---|---|---|---|---|
|  |  |  | BERYL | CHRYSOBERYL | PHENACITE | BERTRANDITE |
| TREATMENT ONLY WITH ALKALINE SOLUTION | EXP.*1 | $NH_3$(R.T.) | × | × | × | × |
|  |  | NaOH(R.T.) | △ | △ | △ | △ |
|  |  | KOH(R.T.) | △ | △ | △ | △ |
|  | EXP.*2 | $NH_3$(MW) | × | × | × | × |
|  |  | NaOH(MW) | △ | △ | △ | △ |
|  |  | KOH(MW) | △ | △ | △ | △ |
| TREATMENT ONLY WITH ACIDIC SOLUTION | EXP.*3 | HCl(R.T.) | × | × | × | × |
|  |  | $H_2SO_4$(R.T.) | × | × | × | × |
|  |  | $HNO_3$(R.T.) | × | × | × | × |
|  | EXP.*4 | HCl(MW) | × | × | ◎ | ◎ |
|  |  | $H_2SO_4$(MW) | × | × | ◎ | ◎ |
|  |  | $HNO_3$(MW) | × | × | △ | △ |
| TREATMENT WITH ALKALINE SOLUTION, AND THEN WITH ACIDIC SOLUTION | EXP.*5 | NaOH (R.T.)<br>→HCl (R.T.) | × | × | × | × |
|  | EXP.*6 | NaOH (MW)<br>→HCl (MW) | ◎ | ◎ | ◎ | ◎ |
|  |  | NaOH (MW)<br>→$H_2SO_4$ (MW) | ○ | ○ | ◎ | ◎ |
|  |  | NaOH (MW)<br>→$HNO_3$ (MW) | ○ | ○ | ○ | ○ |
|  |  | KOH (MW)<br>→HCl (MW) | ○ | ○ | ○ | ○ |
|  |  | KOH (MW)<br>→$H_2SO_4$ (MW) | ○ | ○ | ○ | ○ |
|  |  | KOH (MW)<br>→$HNO_3$ (MW) | ○ | ○ | ○ | ○ |

◎ : COMPLETELY DISSOLVED.   ○ : ALMOST COMPLETELY DISSOLVED.   △ : DISSOLVED A LITTLE.   × : NOT DISSOLVED.
*: "EXP." STANDS FOR "EXPERIMENT".

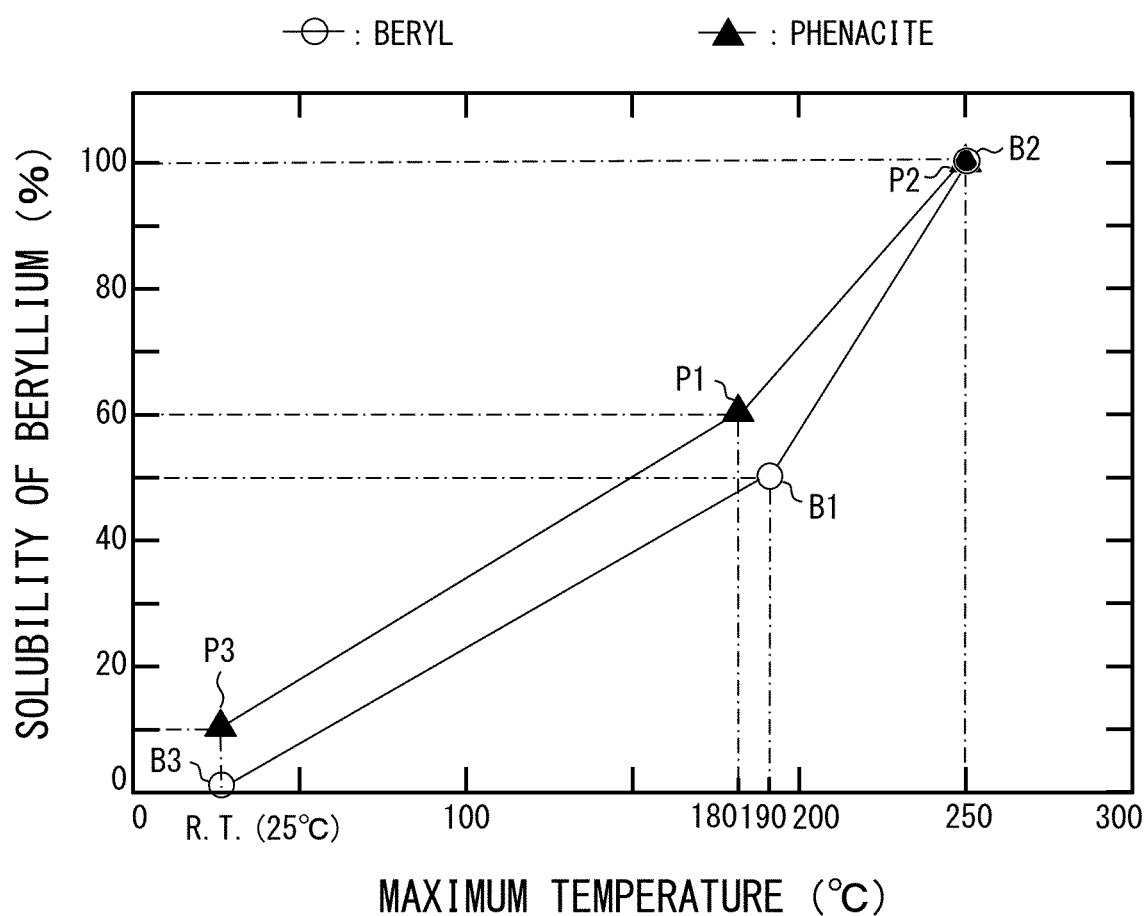

| | | Be-Al-Si-O, Be-Al-O (BERYL) | | | Be-Si-O (PHENACITE) | |
|---|---|---|---|---|---|---|
| | | Be | Al | Si | Be | Si |
| TREATMENT ONLY WITH ALKALINE SOLUTION | EXP.* 1 NaOH (R.T.) | 3 | 3 | 1 | 1 | 2 |
| | EXP.* 2 NaOH (MW) | 35 | 32 | 33 | 16 | 23 |
| TREATMENT ONLY WITH ACIDIC SOLUTION | EXP.* 3 HCl (R.T.) | 6 | 5 | 1 | 12 | 1 |
| | EXP.* 4 HCl (MW) | 10 | 6 | 1 | 100 | 0.5 |
| TREATMENT WITH ALKALINE SOLUTION, AND THEN WITH ACIDIC SOLUTION | EXP.* 5 NaOH (R.T.) + HCl (R.T.) | 6 | 8 | 2 | 12 | 12 |
| | EXP.* 6 NaOH (MW) + HCl (MW) | 100 | 100 | 3 | 100 | 0.5 |

*: "EXP." STANDS FOR "EXPERIMENT". UNIT:%

(b)

| Be-Al-Si-O, Be-Al-O (BERYL) | | | Be-Si-O (PHENACITE) | |
|---|---|---|---|---|
| Be | Al | Si | Be | Si |
| 3.1 | 6.3 | 20.0 | 15.2 | 22.0 |

FIG. 11

|  |  |  | Be-Al-Si-O, Be-Al-O | | Be-Si-O | |
| --- | --- | --- | --- | --- | --- | --- |
|  |  |  | BERYL | CHRYSOBERYL | PHENACITE | BERTRANDITE |
| TREATMENT ONLY WITH ALKALINE SOLUTION | EXP. *1 | $NH_3$ (R.T.) | × | × | × | × |
|  |  | NaOH (R.T.) | × | × | × | × |
|  |  | KOH (R.T.) | × | × | × | × |
|  | EXP. *2 | $NH_3$ (MW) | × | × | × | × |
|  |  | NaOH (MW) | △ | △ | △ | △ |
|  |  | KOH (MW) | △ | △ | △ | △ |
| TREATMENT ONLY WITH ACIDIC SOLUTION | EXP. *3 | HCl (R.T.) | × | × | △ | △ |
|  |  | $H_2SO_4$ (R.T.) | × | × | △ | △ |
|  |  | $HNO_3$ (R.T.) | × | × | × | × |
|  | EXP. *4 | HCl (MW) | △ | △ | ◎ | ◎ |
|  |  | $H_2SO_4$ (MW) | △ | △ | ◎ | ◎ |
|  |  | $HNO_3$ (MW) | △ | △ | ○ | ○ |
| TREATMENT WITH ALKALINE SOLUTION, AND THEN WITH ACIDIC SOLUTION | EXP. *5 | NaOH (R.T.) →HCl (R.T.) | × | × | △ | △ |
|  | EXP. *6 | NaOH (MW) →HCl (MW) | ◎ | ◎ | ◎ | ◎ |
|  |  | NaOH (MW) →$H_2SO_4$ (MW) | ○ | ○ | ◎ | ◎ |
|  |  | NaOH (MW) →$HNO_3$ (MW) | ○ | ○ | ○ | ○ |
|  |  | KOH (MW) →HCl (MW) | ◎ | ◎ | ◎ | ◎ |
|  |  | KOH (MW) →$H_2SO_4$ (MW) | ○ | ○ | ◎ | ◎ |
|  |  | KOH (MW) →$HNO_3$ (MW) | ○ | ○ | ○ | ○ |

◎ : COMPLETELY DISSOLVED. (SOLUBILITY: 100%)   ○ : ALMOST COMPLETELY DISSOLVED. (SOLUBILITY: 50% OR MORE)
△ : DISSOLVED A LITTLE. (SOLUBILITY: 50% OR LESS)   × : NOT DISSOLVED. (SOLUBILITY: 10% OR LESS)

METHOD FOR PRODUCING BERYLLIUM SOLUTION, METHOD FOR PRODUCING BERYLLIUM, METHOD FOR PRODUCING BERYLLIUM HYDROXIDE, METHOD FOR PRODUCING BERYLLIUM OXIDE, AND BERYLLIUM OXIDE

CROSS-REFERENCE TO RELATED APPLICATIONS

This application is a 35 U.S.C. § 371 national stage filing of International Application No. PCT/JP2020/032263, filed on Aug. 27, 2020, which claims priority to Japanese Patent Application No. 2019-158616, filed on Aug. 30, 2019. The entire contents of each of the aforementioned applications are incorporated herein by reference.

TECHNICAL FIELD

The present invention relates to a method for producing a beryllium solution from beryllium oxide. The present invention also relates to beryllium, beryllium hydroxide, a method for producing beryllium oxide, and beryllium oxide.

BACKGROUND ART

It is known that beryllium is contained in a Be—Si—O ore and a Be—Si—Al—O ore. Examples of the Be—Si—O ore encompass bertrandite and phenacite. Examples of the Be—Si—Al—O ore encompass beryl and chrysoberyl. Hereinafter, ores containing beryllium such as those described above are called beryllium ores. The beryllium ore is an example of beryllium oxide.

In order to produce any of beryllium, a compound containing beryllium, and an alloy containing beryllium, a beryllium ore is first dissolved in a solvent so that beryllium is extracted from the beryllium ore. However, it is not easy to dissolve the beryllium ore in the solvent. Although an acidic solution such as sulfuric acid is known as a solvent in which a beryllium ore is easily dissolved, the beryllium ore is difficult to be dissolved even in the acidic solution.

Non-patent Literature 1 states that subjecting a beryllium ore to a pre-treatment such as a sintering treatment or a melting treatment makes it possible to dissolve the beryllium ore in the solvent.

CITATION LIST

Non-Patent Literature

[Non-Patent Literature 1]
 "Beryllium", [online], Wikipedia, [searched on Jun. 25, 2019], Internet <URL: https://en.wikipedia.org/siki/Beryllium>

SUMMARY OF INVENTION

Technical Problem

However, the pre-treatment for making the beryllium ore soluble in the solvent requires a quite large energy. According to the item "Production" in Non-patent Literature 1, the temperature at which the sintering treatment is carried out is, e.g., 770° C., and the temperature at which the melting treatment is carried out is, e.g., 1650° C.

An invention in accordance with one aspect of the present invention was made in light of the above problem, and has an object to provide a method for producing a beryllium solution by dissolving beryllium oxide, the method being novel and having high energy efficiency.

Solution to Problem

A method in accordance with an aspect of the present invention for producing a beryllium solution includes a main heating step of dielectrically heating an acidic solution containing beryllium oxide to generate a beryllium solution.

A method in accordance with an aspect of the present invention for producing beryllium includes: each step included in the method in accordance with the aspect for producing the beryllium solution; an anhydrization step of carrying out anhydrization of the beryllium solution so as to generate beryllium salt; and an electrolyzing step of carrying out molten salt electrolysis of the beryllium salt so as to generate beryllium.

A method in accordance with an aspect of the present invention for producing beryllium hydroxide includes: each step included in the method in accordance with the aspect for producing the beryllium solution; and a neutralizing step of neutralizing, with a base, the beryllium solution so as to generate beryllium hydroxide.

A method in accordance with an aspect of the present invention for producing beryllium oxide includes: each step included in the method in accordance with the aspect for producing the beryllium solution; and a third heating step of heating the beryllium solution so as to generate beryllium oxide.

Beryllium oxide in accordance with an aspect of the present invention includes: plural recesses formed on a surface of the beryllium oxide, the beryllium oxide having crystallinity, a part of or all of the plural recesses each having an opening whose shape reflects a shape of a unit grid of crystal.

Advantageous Effects of Invention

In accordance with an aspect of the present invention, it is possible to provide a method for producing a beryllium solution by dissolving beryllium oxide, the method being novel and having high energy efficiency.

BRIEF DESCRIPTION OF DRAWINGS

FIG. 7 shows a table summarizing the dissolved amounts of Be, Al, and Si in Experiments 1 to 6 shown in FIG. 4.

FIG. 8 shows a table summarizing the experimental results of Experiments 1 to 6 shown in FIG. 4.

FIG. 9 shows a graph, related to phenacite in Experiment 4 and beryl in Experiment 6 shown in FIG. 4, indicating a correlation between a maximum temperature of an acidic solution and a solubility of beryllium observed when the main heating step was carried out.

FIG. 10 shows a table summarizing the dissolved amounts of elements in Experiments 1 to 6, which were conducted additionally in similar manners to Experiments 1 to 6 shown in FIG. 4.

FIG. 11 shows a table summarizing the experimental results of Experiments 1 to 6, which were conducted additionally in similar manners to Experiments 1 to 6 shown in FIG. 4.

DESCRIPTION OF EMBODIMENTS

Embodiment 1

(Method M10 for Producing Beryllium Solution)

Figure 1:
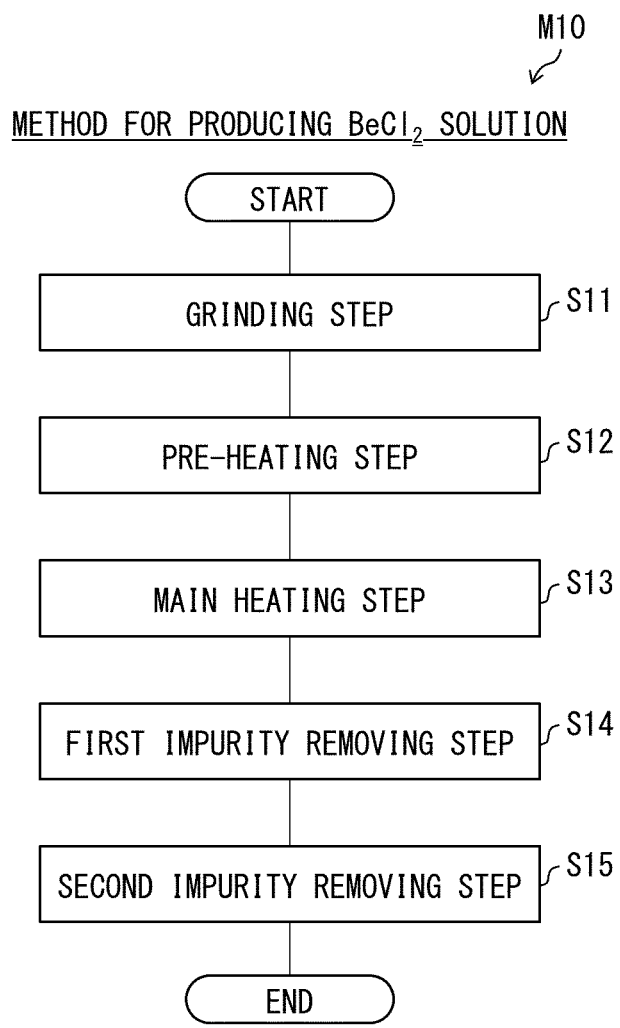
FIG. 1 shows a flowchart illustrating a method in accordance with Embodiment 1 of the present invention for producing a beryllium chloride solution.

The following description will discuss a method M10 for producing a beryllium solution in accordance with Embodiment 1 of the present invention with reference to FIG. 1. FIG. 1 shows a flowchart of the method M10 for producing the beryllium solution. Hereinafter, the method M10 for producing the beryllium solution may also simply be referred to as a production method M10. The following description in Embodiment 1 will discuss a method for producing a $BeCl_2$ solution, which is an aqueous solution of beryllium chloride ($BeCl_2$) that is a hydrochloride of beryllium. However, the beryllium solution to be produced by the production method M10 is not limited to the $BeCl_2$ solution, but may be a $BeSO_4$ solution, a $Be(NO_3)_2$ solution, beryllium fluoride ($BeF_2$), beryllium bromide ($BeBr_2$), or beryllium iodide ($BeI_2$). The $BeSO_4$ solution is an aqueous solution of beryllium sulfate ($BeSO_4$), which is a sulfate of beryllium. The $Be(NO_3)_2$ solution is an aqueous solution of beryllium nitrate ($Be(NO_3)_2$), which is a nitrate of beryllium. Beryllium fluoride ($BeF_2$) is a hydrofluoric acid salt of beryllium. Beryllium bromide ($BeBr_2$) is a hydrobromide of beryllium. Beryllium iodide ($BeI_2$) is a hydroiodide of beryllium.

As shown in FIG. 1, the production method M10 includes a grinding step S11, a pre-heating step S12, a main heating step S13, a first impurity removing step S14, and a second impurity removing step S15. The production method M10 employs a beryllium ore as a raw material from which a beryllium solution is to be produced. The beryllium ore is a generic term for ores containing beryllium, and is an example of beryllium oxide. The beryllium ore has crystallinity. The beryllium ores are classified mainly into a Be—Si—O ore containing beryllium and silicon and a Be—Si—Al—O ore containing beryllium, silicon, and aluminum. Examples of the Be—Si—O ore encompass bertrandite and phenacite. Examples of the Be—Si—Al—O ore encompass beryl and chrysoberyl. The following description in Embodiment 1 will discuss the production method M10 employing beryl as an example of the raw material.

The grinding step S11 is a step of grinding a block of beryl into particles. The technique used to grind beryl is not limited to any particular one, and may be selected from existing techniques as appropriate. Such a technique may be, for example, a technique involving use of a hammer or a ball mill. Alternatively, the technique used to grind beryl may be a combination of two or more techniques (e.g., a hammer and a ball mill). In this case, the hammer may be used at a first stage in the grinding step S11, and the ball mill may be used at a second stage in the grinding step S11.

By grinding beryl into smaller particles, it is possible to increase a percentage of a surface area of beryl with respect to a total volume of beryl. This is expected to reduce a period of time required for beryllium contained in beryl to be dissolved in a solution in each of a pre-heating step S12 and a main heating step S13, which will be described later. Meanwhile, grinding beryl into excessively small particles increases a period of time and cost taken for the grinding step S11. Therefore, the particle diameter of beryl to be obtained through the grinding step S11 is preferably determined in consideration of the period of time taken for the pre-heating step S12 and the main heating step S13, the period of time taken for the grinding step S11, the cost taken for the grinding step S11, and/or the like.

The particle diameter of beryl may be any of an average diameter, a mode diameter, and a median diameter. In a case where a particle diameter distribution of beryl is obtained, the average diameter is a particle diameter corresponding to an average in the particle diameter distribution thus obtained, the mode diameter is a highest frequency particle diameter in the particle diameter distribution, and the median diameter is a particle diameter corresponding to 50% cumulative frequency in the particle diameter distribution.

In Embodiment 1, the grinding step S11 is carried out so that the average diameter of beryl is 100 μm.

(Pre-Heating Step S12)

The pre-heating step S12 is a step that is to be carried out before the later-described main heating step S13 and that dielectrically heats a basic solution containing beryl. The basic solution is not limited to any particular one, and may be an aqueous solution of sodium hydroxide (NaOH) or an aqueous solution of potassium hydroxide (KOH), each of which is a basic solute. In Embodiment 1, a NaOH solution is used as the basic solution. The concentration of NaOH in the NaOH solution can be adjusted as appropriate. Preferably, this concentration is adjusted to have a pH of not less than 14.

The dielectric heating is a generic term for techniques for applying, to a target object, an electromagnetic wave having a given frequency so as to heat the target object. According to the band of the electromagnetic wave to be applied, the dielectric heating is called radio-frequency heating or microwave heating. For example, the radio-frequency heating applies, to the target object, an electromagnetic wave (a so-called short wave or an ultrashort wave) within a band of not less than 3 MHz and less than 300 MHz, whereas the microwave heating applies, to the target object, an electromagnetic wave (a so-called microwave) within a band of not less than 300 MHz and less than 30 GHz. A microwave oven, which is widely used also in home, is an example of a device that can carry out microwave heating.

In Embodiment 1, the pre-heating step S12 applies, to the NaOH solution containing beryl, an electromagnetic wave having a frequency of 2.45 GHz. A configuration of a device that applies an electromagnetic wave to a NaOH solution containing beryl will be described later with reference to FIG. 3.

Carrying out the pre-heating step S12 before the main heating step S13 forms plural recesses on a surface of beryl. Part of or all of the plural recesses has/have an opening whose shape reflects the shape of a unit grid of crystal. As compared to the surface of beryl having not been subjected to the pre-heating step S12 yet, the surface of beryl in which the plural recesses are formed is fragile. Thus, by carrying out the later-described main heating step S13 on beryl having been subjected to the pre-heating step S12, beryl can be dissolved in an acidic solution. As discussed above, with the production method M10 including the pre-heating step S12, it is possible to dissolve a Be—Si—Al—O ore (e.g., beryl or chrysoberyl), which is difficult to be dissolved when being subjected to the main heating step S13 alone. Therefore, the production method M10 can employ, as a starting material from which a beryllium chloride solution is produced, not only the Be—Si—O ore (e.g., bertrandite or phenacite), which is relatively easy to be dissolved in an acidic solution, but also the Be—Si—Al—O ore, which is difficult to be dissolved in the acidic solution.

In a case where the Be—Si—O ore such as bertrandite, not the Be—Si—Al—O ore such as beryl, is used as the raw material, the production method M10 may or may not include the pre-heating step S12.

Note that, as described above, the scope of the present invention also encompasses (i) beryl that has undergone the pre-heating step S12 and (ii) a basic solution that has undergone the pre-heating step S12 and that contains beryl, which is an example of beryllium oxide, and a beryllium ion. The basic solution is an example of the beryllium solution.

As described above, beryl having a surface provided with plural recesses each having an opening whose shape reflects the shape of a unit grid of crystal can be dissolved in an acidic solution when being subjected to the later-described main heating step S13. Thus, beryl that has undergone the pre-heating step S12 is suitable as a raw material from which a beryllium solution is to be produced.

Incidentally, in a case where the Be—Si—Al—O ore is not subjected to the pre-heating step S12 and is subjected to the main heating step S13 alone, the Be—Si—Al—O ore such as beryl is difficult to be dissolved. Meanwhile, forming the plural recesses formed on the surface of the Be—Si—Al—O ore makes it possible even for the Be—Si—Al—O ore to be dissolved when being subjected to the main heating step S13.

A heating temperature in the pre-heating step S12 can be set as appropriate. The heating temperature in the pre-heating step S12 is preferably equal to or lower than a heatproof temperature of a container (e.g., a container 14 described in Embodiment 5) storing the basic solution containing beryl. For example, in a case where the container is made of polytetrafluoroethylene (e.g., the container 14), the heating temperature in the pre-heating step S12 is preferably not higher than 250° C. In a case where the container is made of a material having corrosion resistance against the basic solution and a heatproof temperature higher than 250° C., the heating temperature in the pre-heating step S12 may be higher than 250° C. It is highly probable that increasing the heating temperature in the pre-heating step S12 will shorten the period of time taken for the pre-heating step S12. The heating temperature in the pre-heating step S12 is preferably not lower than 180° C. By carrying out the pre-heating step S12 at a heating temperature of not lower than 180° C. and the later-described main heating step S13 in combination, it is possible to dissolve, in a solution, a lot of beryllium contained in beryl. A heating time in the pre-heating step S12 can also be set as appropriate. Preferably, the heating time is not less than 60 minutes, for example.

(Main Heating Step S13)

The main heating step S13 is a step that is to be carried out after the pre-heating step S12 and that dielectrically heats the acidic solution containing beryl so as to generate a beryllium solution, which is an acidic solution containing beryllium dissolved therein.

The acidic solution is not limited to any particular one. The aqueous solution can be an aqueous solution of any of hydrogen chloride (HCl), sulfuric acid ($H_2SO_4$), nitric acid ($HNO_3$), hydrogen fluoride (HF), hydrogen bromide (HBr), and hydrogen iodide (HI), each of which is an acidic solute. In Embodiment 1, an HCl solution is used as the acidic solution. The concentration of HCl in the HCl solution can be adjusted as appropriate. Preferably, the concentration of HCl in the HCl solution is adjusted to have a pH of not more than 1.

By adding an appropriate amount of HCl solution to the NaOH solution that has undergone the pre-heating step S12, the basic solution containing beryllium is turned, through neutrality, into an acidic solution containing beryllium.

The dielectric heating carried out in the main heating step S13 is similar to that carried out in the pre-heating step S12. That is, in Embodiment 1, the main heating step S13 applies, to the HCl solution containing beryl, an electromagnetic wave having a frequency of 2.45 GHz.

By heating the acidic solution containing beryllium oxide through the dielectric heating, it is possible to dissolve the beryllium oxide in the acidic solution with higher energy efficiency than conventional. Specifically, it is possible to yield a hydrochloric acid solution in which beryllium chloride hydrate ($BeCl_2 \cdot xH_2O$) is dissolved. Thus, the production method M10 can be provided as a novel production method with high energy efficiency.

A heating temperature in the main heating step S13 can be set as appropriate in a similar manner to that in the pre-heating step S12. That is, in a case where a container (e.g., the container 14 described in Embodiment 5) storing the acidic solution containing beryl is made of polytetrafluoroethylene, the heating temperature in the main heating step S13 is preferably not higher than 250° C. The heating temperature in the main heating step S13 is preferably not lower than 180° C. A heating time in the main heating step S13 can also be set as appropriate. Preferably, the heating time is not less than 60 minutes, for example.

(First Impurity Removing Step S14)

The first impurity removing step S14 is a step that is to be carried out after the main heating step S13. The first impurity removing step S14 is a step of removing, with use of an organic compound that adsorbs a first element, the first element from the $BeCl_2$ solution obtained through the main heating step S13.

The first element to be removed in the first impurity removing step S14 varies depending on the organic compound used here. Examples of the organic compound that can be used in the first impurity removing step S14 encompass tri-n-octylphosphine oxide (TOPO), di-(2-ethylhexyl) phosphoric acid (D2EHPA), tri-n-butyl phosphate (TBP), and ethylenediaminetetraacetic acid (EDTA). Examples of a commercially-available organic compound that can be used in the first impurity removing step S14 encompass UTEVA (registered trademark) resin available from Eichrom Technologies.

TOPO can adsorb Al, Au, Co, Cr, Fe, Hf, Re, Ti, $UO_2^{2+}$, V, Zr, rare earth elements, and actinoid elements. D2EHPA can adsorb U, Co, Ni, Mn, and the like. TBP can adsorb U, Th, and the like. EDTA and similar ones can adsorb Mg, Ca, Ba, Cu, Zn, Al, Mn, Fe, and the like. UTEVA (registered trademark) resin can adsorb U, Th, Pu, Am, and the like. These elements are examples of the first element.

Any of the organic compounds can be dissolved in an organic solvent (e.g., kerosene, cyclohexane, benzene). The HCl that has undergone the main heating step S13 is mixed with the solution in which any of these organic compounds is dissolved, and a resultant is stirred. Consequently, the organic compound adsorbs the first element.

In the first impurity removing step S14, the HCl solution with which the organic compound solution is to be mixed is preferably acidic, and preferably has a pH of not more than 2. With this configuration, it is also possible to enhance the efficiency at which the organic compound adsorbs the first element, while avoiding a phenomenon that the organic compound adsorbs beryllium. Note that, as the property of the HCl solution gets becomes closer to neutrality, the efficiency at which the organic compound adsorbs beryllium increases and the efficiency at which the organic compound adsorbs the first element decreases.

In Embodiment 1, the organic compound and the organic solvent used in the first impurity removing step S14 are TOPO and kerosene, respectively. However, the organic compound and the organic solvent are not limited to TOPO and kerosene, and can be selected as appropriate from among the combinations shown as examples above.

A mixture of the $BeCl_2$ solution, which is an aqueous solution, obtained through the main heating step S13 and the organic solvent is separated into two layers after being left for a while. Thus, the $BeCl_2$ solution in which the content of the first element has been reduced as a result of the first impurity removing step S14 and the organic solvent containing the first element can easily be separated from each other.

By carrying out the first impurity removing step S14, it is possible to reduce the concentration of the first element in the beryllium solution. Consequently, even in a case where, in a process for dissolving a beryllium ore in an acidic solution so as to produce a beryllium solution, the beryllium ore contains a first element that is an element other than beryllium such as those described above, it is possible to reduce the concentration of the first element in the beryllium solution used to produce any of beryllium, beryllium hydroxide, and beryllium oxide. Examples of the first element encompass uranium, thorium, plutonium, and americium.

(Second Impurity Removing Step S15)

The second impurity removing step S15 is a step that is to be carried out after the main heating step S13 and that adjusts the polarity of the $BeCl_2$ solution from acidity to neutrality, and then to basicity so as to remove a second element from the $BeCl_2$ solution, the $BeCl_2$ solution having been obtained through the main heating step S13. In the description in Embodiment 1, the first impurity removing step S14 and the second impurity removing step S15 are carried out in this order after the main heating step S13. Alternatively, the order of the first impurity removing step S14 and the second impurity removing step S15 can be changed.

In Embodiment 1, the second impurity removing step S15 adds, to the beryllium solution (the HCl solution containing beryllium) that has undergone the main heating step S13, sodium bicarbonate ($NaHCO_3$) until sodium bicarbonate is saturated. Consequently, after the polarity of the beryllium solution is changed to exceed neutrality (pH 7), an element(s) (e.g., Al and/or Fe) other than beryllium is/are turned into hydroxide(s) (e.g., $Al(OH)_3$ and/or $Fe(OH)_3$) so as to be precipitated in the beryllium solution. Even in a state in which sodium bicarbonate is saturated, $Be(OH)_2$ is dissolved in the beryllium solution and would not be precipitated. As described above, aluminum (Al) and iron (Fe) are examples of the second element.

The hydroxide(s) of the element(s) other than beryllium precipitated in the beryllium solution as a result of the second impurity removing step S15 can easily be removed from the beryllium solution by filtering the beryllium solution.

It is preferable to add HCl again to the beryllium solution from which the second element has been removed as a result of the second impurity removing step S15. By adding HCl again to the beryllium solution, the polarity of the $Be(OH)_2$ solution is adjusted to neutrality, and then to acidity. Consequently, in the solution, a highly pure beryllium chloride hydrate ($BeCl_2 \cdot xH_2O$) is generated.

By carrying out the second impurity removing step S15, it is possible to reduce the concentration of the second element in the beryllium solution. Consequently, even in a case where, in a process for dissolving a beryllium ore in an acidic solution so as to produce a beryllium solution, the beryllium ore contains a second element that is an element other than beryllium such as those described above, it is possible to reduce the concentration of the second element in the beryllium solution used to produce any of beryllium, beryllium hydroxide, and beryllium oxide.

As described above, in the production method M10, it is preferable that (a) the pre-heating step S12 dielectrically heat the basic solution containing beryllium oxide by applying a microwave to the basic solution and (b) the main heating step S13 dielectrically heat the acidic solution containing beryllium oxide by applying a microwave to the acidic solution.

The technique of the dielectric heating involving use of a microwave (i.e., microwave dielectric heating) is a technique used for so-called microwave ovens, that is, a widely-used technique. Therefore, the production method M10 can reduce the cost required to carry out the production method M10, as compared to conventional production methods.

As described above, in the production method M10, the beryllium solution is preferably a beryllium chloride solution.

With the production method M10, it is possible to easily produce the beryllium chloride solution while skipping the phase of beryllium hydroxide. From the beryllium chloride solution, it is possible to easily produce beryllium, beryllium hydroxide, and beryllium oxide, as will be described later. Therefore, the beryllium chloride solution is suitable as the beryllium solution.

Embodiments 2 to 4

Figure 2:
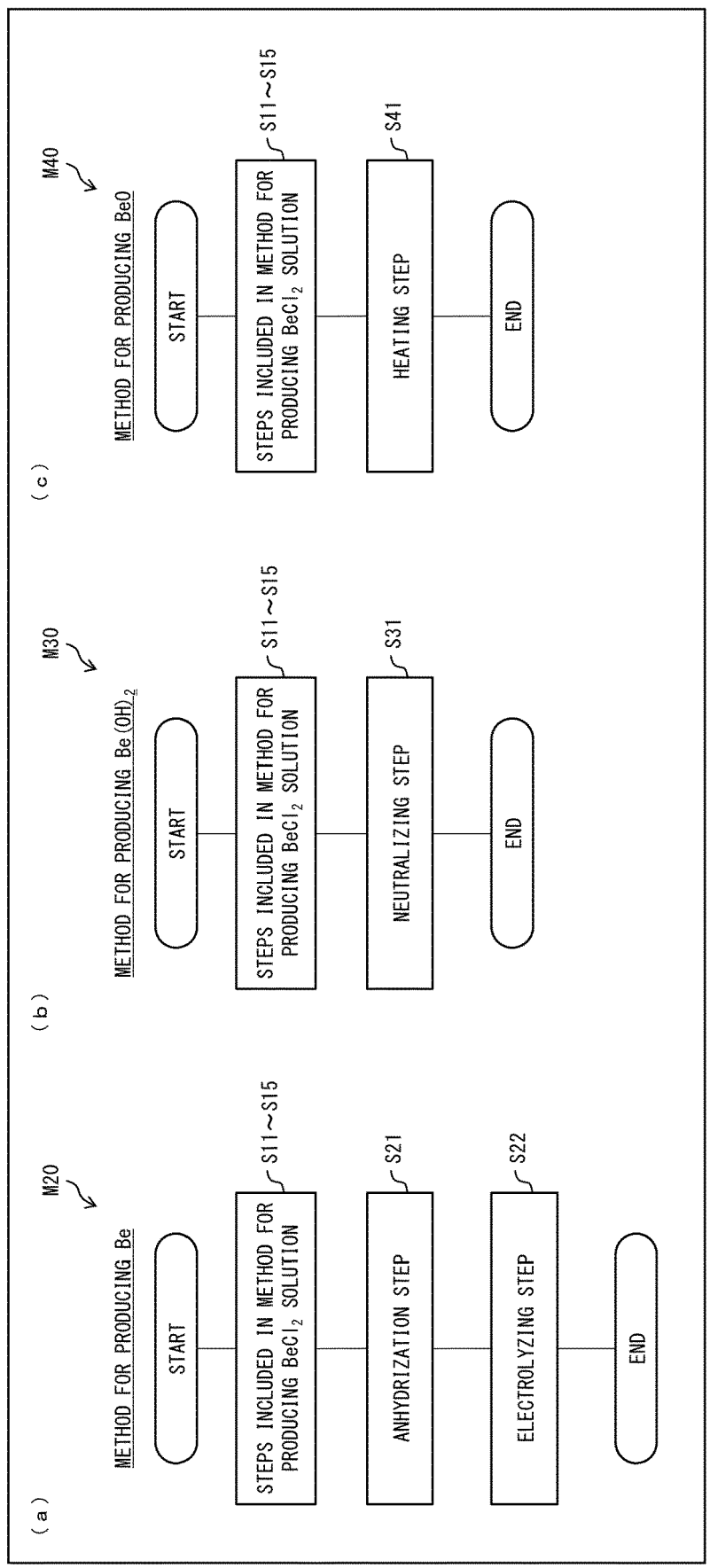
FIG. 2 shows a flowchart illustrating a method for producing beryllium, a flowchart illustrating a method for producing beryllium hydroxide, and a flowchart illustrating a method for producing beryllium oxide, each of which is in accordance with Embodiment 2 of the present invention.

With reference to (a) to (c) of FIG. 2, the following description will discuss a method M20 for producing beryllium (Be), a method M30 for producing beryllium hydroxide ($Be(OH)_2$), and a method M40 for producing beryllium oxide (BeO) in accordance with Embodiments 2 to of the present invention. (a) to (c) of FIG. 2 show a flowchart indicating a main part of the method M20 for producing beryllium, a flowchart of a main part of the method M30 for producing beryllium hydroxide, and a flowchart of a main part of the method M40 for producing beryllium oxide, respectively. Hereinafter, the method M20 for producing beryllium, the method M30 for producing beryllium hydroxide, and the method M40 for producing beryllium oxide may also simply be referred to as the production method M20, the production method M30, and the production method M40, respectively.

(Method M20 for Producing Beryllium)

As shown in FIG. 2, the production method M20 includes the grinding step S11, the pre-heating step S12, the main heating step S13, the first impurity removing step S14, and the second impurity removing step S15, each of which is included in the production method M10 shown in FIG. 1, as well as an anhydrization step S21 and an electrolyzing step S22. Hereinafter, the grinding step S11, the pre-heating step S12, the main heating step S13, the first impurity removing step S14, and the second impurity removing step S15 may simply be referred to as the steps S11 to S15, respectively.

The steps S11 to S15 of the production method M10 that are included in the production method M20 are similar to the steps S11 to S15 described in Embodiment 1. Therefore, a description of the steps S11 to S15 is omitted here. That is, on the basis of an assumption that a $BeCl_2$ solution has been obtained by dissolving $BeCl_2$ in an HCl solution, the description of the production method M20 will deal with only the anhydrization step S21 and the electrolyzing step S22.

The anhydrization step S21 is a step of carrying out anhydrization of $BeCl_2 \cdot xH_2O$ contained in the $BeCl_2$ solution obtained through steps S11 to S15 of the production method M10 so that $BeCl_2$, which is an example of beryllium salt, is generated.

The anhydrization step S21 adds ammonium chloride to the beryllium chloride hydrate, and heats the beryllium chloride hydrate in a vacuum at 90° C. for 24 hours. This can make the moisture content almost zero. That is, this can make the beryllium chloride hydrate anhydrous.

The ammonium chloride reacts with the moisture in the beryllium chloride hydrate, so as to be turned into ammonium chloride and hydrochloric acid. The ammonium chloride and the hydrochloric acid thus generated react with each other again, and are turned back into ammonium chloride while discharging water. As a result of the process carried out in this manner, it is possible to obtain beryllium chloride through anhydrization of the beryllium chloride hydrate.

The heating temperature in the anhydrization step S21 is not limited to 90° C., and may be selected as appropriate from a temperature range of not lower than 80° C. and not higher than 110° C. However, setting the heating temperature too high often causes insufficient anhydrization of the beryllium chloride hydrate. Therefore, the heating temperature is preferably not lower than 80° C. and not higher than 90° C., and more preferably is 90° C.

The period of time taken for the anhydrization treatment in the anhydrization step S21 is not limited to 24 hours, and may be set as appropriate.

The electrolyzing step S22 is a step of carrying out molten salt electrolysis of $BeCl_2$ obtained through the anhydrization step S21 so as to generate metal beryllium.

As described above, by carrying out the production method M20, it is possible to produce metal beryllium from a beryllium ore through the phase of a $BeCl_2$ solution. In other words, by carrying out the production method M20, it is possible to produce beryllium from a beryllium ore while skipping the phase of beryllium hydroxide. Currently, there are commercially available production methods for producing beryllium from a beryllium ore. According to the methods, beryllium hydroxide, which is highly demanded in general, is first produced from a beryllium ore, and then beryllium is produced from the beryllium hydroxide. Thus, the production method M20 can produce beryllium in an easier manner, as compared to the currently commercially available methods for producing beryllium.

(Method M30 for Producing Beryllium Hydroxide)

As shown in FIG. 2, the production method M30 includes the steps S11 to S15 of the production method M10 as well as a neutralizing step S31. As is the case with the production method M20, the description here will deal with only the neutralizing step S31.

The neutralizing step S31 is a step of neutralizing, with a base, $BeCl_2 \cdot xH_2O$ contained in the $BeCl_2$ solution obtained through the steps S11 to S15 of the production method M10 so as to generate $Be(OH)_2$.

As described above, by carrying out the production method M30, it is possible to produce $Be(OH)_2$ from a beryllium ore.

(Method M40 for Producing Beryllium Oxide)

As shown in FIG. 2, the production method M40 includes the steps S11 to S15 of the production method M10 as well as a heating step S41. As is the case with the production method M20, the description here will deal with only the heating step S41.

The heating step S41 includes a third heating step of heating the $BeCl_2$ solution obtained through the steps S11 to S15 of the production method M10 so as to generate BeO. As a result of the third heating step, $BeCl_2 \cdot xH_2O$ dissolved in the $BeCl_2$ solution is hydrolyzed to generate BeO.

As described above, by carrying out the production method M40, it is possible to produce BeO from a beryllium ore.

Conclusion

In accordance with these production methods M20, M30, and M40, it is possible to produce beryllium, beryllium hydroxide, and beryllium oxide by a novel production method with high energy efficiency. Note that each of the anhydrization step S21, the electrolyzing step S22, the neutralizing step S31, and the heating step S41 can be carried out by utilizing an existing technique.

Embodiment 5

Figures 3, 4:
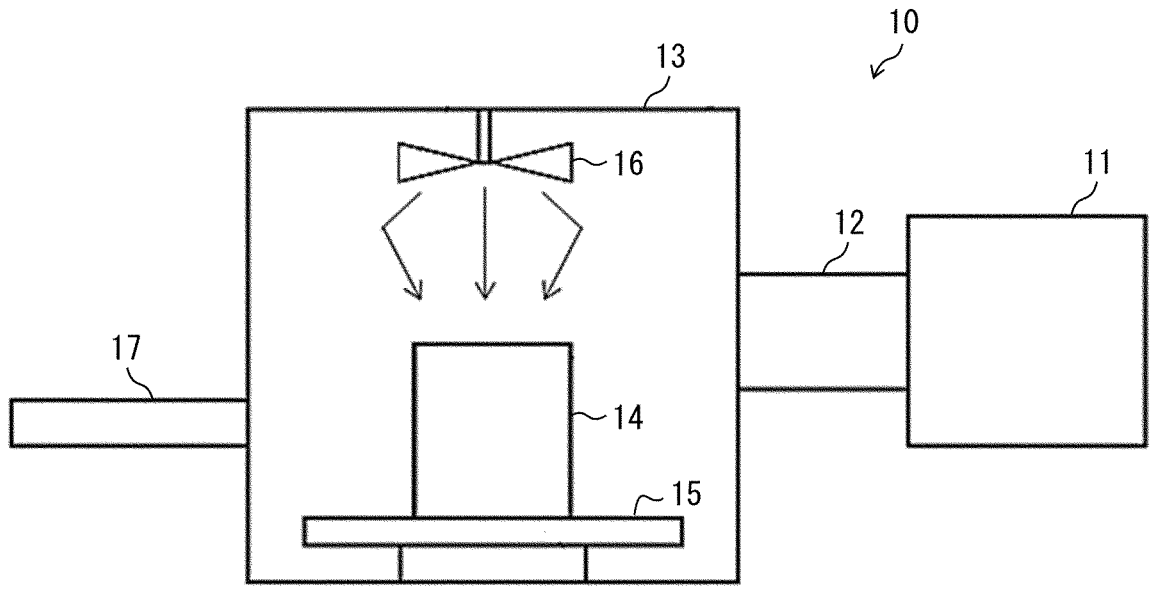
FIG. 3 is a view schematically illustrating a heating device used to carry out a pre-heating step and a main heating step included in a method in accordance with an embodiment of the present invention for producing a beryllium solution.
FIG. 4 shows a table summarizing the experimental conditions for Experiments 1 to 6 including an Example group of the present invention and a Comparative Example group.

The following description will discuss a heating device 10 in accordance with Embodiment 5 of the present invention with reference to FIG. 3. FIG. 3 is a view schematically illustrating the heating device 10. The heating device 10 is a heating device that carries out the pre-heating step S12 and the main heating step S13 included in the production method M10 shown in FIG. 1.

As described in Embodiment 1, the dielectric heating is classified into either radio-frequency heating or microwave heating depending on the band of an electromagnetic wave to be applied. The heating device 10 is a device that carries out, among the radio-frequency heating and the microwave heating, the microwave heating on a target object.

As shown in FIG. 3, the heating device 10 includes a microwave oscillator 11, a waveguide 12, a microwave applying section 13, a container 14, a rotary table 15, a stirrer 16, and a thermometer 17. The heating device 10 further includes a control section, which is not illustrated in FIG. 3.

The microwave oscillator 11 is configured to oscillate an electromagnetic wave having a given frequency. The given frequency can be selected as appropriate within the band of a microwave. In Embodiment 5, the given frequency is 2.45

GHz. The frequency of 2.45 GHz is identical to that of an electromagnetic wave used in microwave ovens for home use.

The waveguide 12 is a metal tubular member having a first end connected with the microwave oscillator 11 and a second end connected with the microwave applying section 13. The waveguide 12 guides, from the first end to the second end, an electromagnetic wave oscillated by the microwave oscillator 11. Then, the waveguide 12 discharges the electromagnetic wave into an internal space of the microwave applying section 13 through the second end.

The microwave applying section 13 is a metal box-shaped member being hollow and having an internal space in which the container 14 can be accommodated. The microwave applying section 13 applies, to the container 14 and a target object to be heated (i.e., a heating target object) that is stored in the container 14, the electromagnetic wave emitted from the second end of the waveguide 12. The microwave applying section 13 is configured to confine an electromagnetic wave in its internal space so that the electromagnetic wave hardly leaks to the outside.

Although not shown in FIG. 3, the container 14 is constituted by a main body and a lid. The main body is made of a tubular side wall and a bottom with which a first end of the side wall is sealed. The container 14, which is constituted by the main body and the lid coupled to each other, is configured to be capable of sealing its internal space defined by the main body and the lid.

The container 14 is preferably made of a material having a high transmittance for an electromagnetic wave (in Embodiment 5, an electromagnetic wave of 2.45 GHz) to be oscillated by the microwave oscillator 11. In Embodiment 5, the container 14 is made of a fluorine-based resin, such as polytetrafluoroethylene.

The container 14 preferably has pressure resistance with which the container 14 can withstand pressure in its internal space even if the pressure in the internal space is greater than atmospheric pressure. Since the container 14 has (i) the internal space that can be sealed and (ii) the pressure resistance with which the container 14 can withstand a given pressure, the container 14 can keep a heating target object in the internal space even if the temperature of the heating target object stored in the internal space increases in response to an electromagnetic wave applied thereto.

The rotary table 15 is a sample table provided on a bottom plane of the internal space of the microwave applying section 13, and has an upper surface on which the container 14 can be placed. The rotary table 15 has a circular shape in a plan view, and is configured to be rotatable, at a given speed, about a center axis of the circular shape as a rotation axis. With this configuration, the container 14 placed on the upper surface of the rotary table 15 rotates at a given speed. This can heat the target object more uniformly.

The stirrer 16 is a metal blade member provided to a ceiling plane of the internal space of the microwave applying section 13. The blade member has a center coupled to a supporting rod, with which the blade member is rotatably fixed to the ceiling plane. The stirrer 16 rotates about the supporting rod as a rotation axis at a given speed, thereby reflecting an electromagnetic wave oscillated by the microwave oscillator 11. Consequently, the electromagnetic wave is scattered into the internal space of the microwave applying section 13. With this configuration, the stirrer 16 scatters the electromagnetic wave. This can heat the target object more uniformly.

The thermometer 17 is a radiation thermometer that detects an infrared ray from the container 14 to measure the temperature of the container 14. After the lapse of a given temperature moderating time, the temperature of the container 14 becomes almost equal to that of the target object stored in the internal space of the container 14. The temperature moderating time depends on the material (in Embodiment 5, a fluorine-based resin) from which the container 14 is made and the thickness (e.g., 1 mm) of the container 14. In a case where the container 14 being made of the fluorine-based resin and having a thickness of 1 mm is employed as in Embodiment 5, the temperature moderating time is assumed to be approximately three minutes. Thus, in a case where the heating time is sufficiently longer than the temperature moderating time and/or in a case a change in temperature of the target object stored in the internal space of the container 14 is sufficiently moderate, the temperature of the target object stored in the internal space of the container 14 can be considered as being equal to the temperature of the container 14. Thus, in such a case, the thermometer 17 can determine that the temperature of the target object is measurable. The thermometer 17 outputs, to the control section, a temperature signal indicative of the measured temperature of the container 14 or the target object.

The control section may control an output from the microwave oscillator 11 so that the output becomes a given value or so that the temperature indicated by the temperature signal received from the thermometer 17 becomes a predetermined temperature. The predetermined temperature may be constant or may be changed over time. In Embodiment 5, the control section controls an output from the microwave oscillator 11 so as to change the value of the output over time. One example of the value of the output that is changed over time may be a pattern according to which the value of the output is changed from 0 W to 600 W in 30 minutes and then is maintained at 600 W for 60 minutes.

By storing, in the internal space of the container 14 of the heating device 10 configured as above, beryl having been ground in the grinding step S11 and the basic solution, it is possible to carry out the pre-heating step S12. Similarly, by storing, in the internal space of the container 14 of the heating device 10, beryl having been subjected to the pre-heating step S12 and the acidic solution, it is possible to carry out the main heating step S13.

Experimental Results

Figure 5:
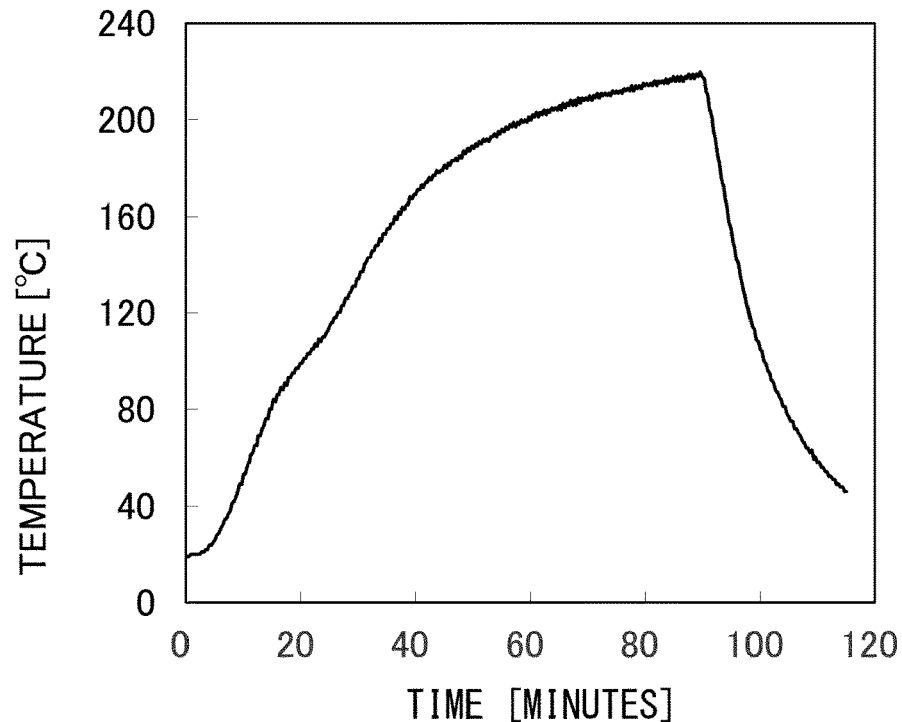
FIG. 5 shows a graph showing a change in temperature of a container in a main heating step included in an Example of the present invention.
Figure 6:
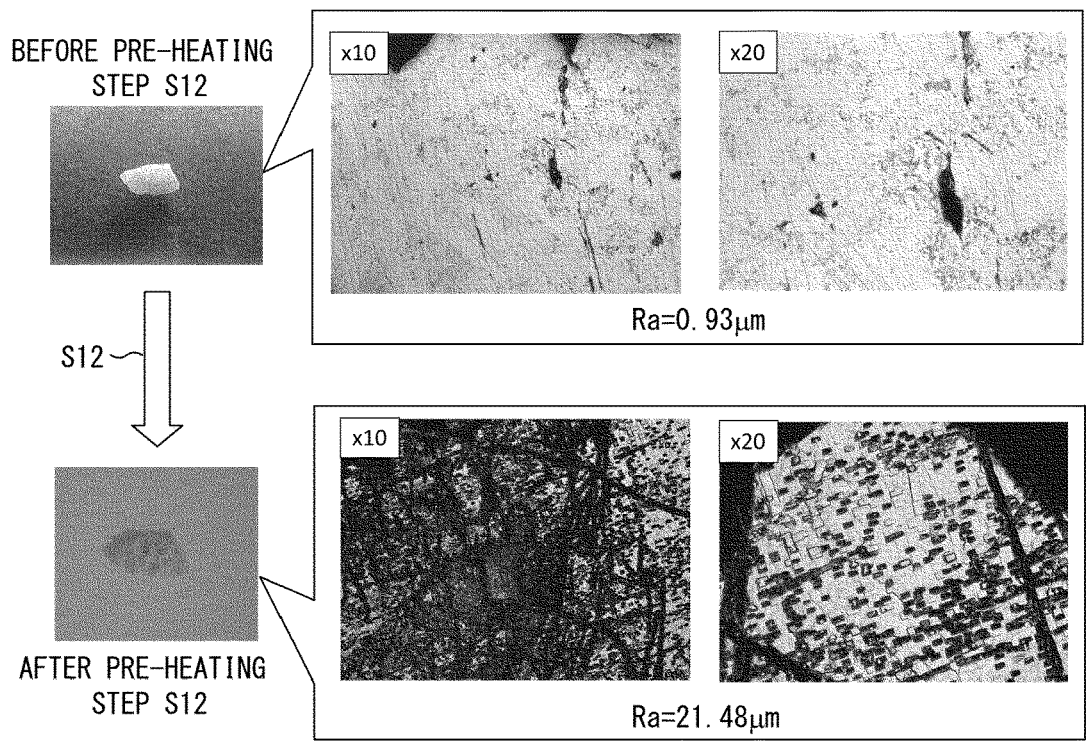
FIG. 6 shows microscopic images of beryl taken before and after a pre-heating step in accordance with an Example of the present invention.

FIG. 4 shows a table summarizing the experimental conditions for Experiments 1 to 6 including an Example group of the present invention and a Comparative Example group. FIG. 5 shows a graph showing a change in temperature of the container in the main heating step S13 included in an Example of the present invention. FIG. 6 shows microscopic images of beryl taken before and after pre-heating step S12 in accordance with an Example of the present invention. FIG. 7 shows a table summarizing the dissolved amounts of Be, Al, and Si in Experiments 1 to 6 shown in FIG. 4. FIG. 8 shows a table summarizing the experimental results of Experiments 1 to 6 shown in FIG. 4. Note that phenacite, which is an example of the Be—Si—O ore, hardly contains Al. Therefore, the dissolved amount of Al indicated in the column of phenacite in FIG. 7 is considered to be derived from a small amount of Al contained in phenacite as an impurity.

As shown in FIG. 4, in each of Experiments 1 and 2, a beryllium ore was treated with a basic solution. In each of Experiments 3 and 4, a beryllium ore was treated with an acidic solution. In each of Experiments 5 and 6, a beryllium ore was treated with a basic solution and then the beryllium ore was treated with an acidic solution. In each of the experiments, it was examined how much beryllium ions contained in the beryllium ore was dissolved in the solution. In other words, Experiment 2 was an experiment that carried out only the pre-heating step S12 shown in FIG. 1, Experiment 4 was an experiment that carried out only the main heating step S13 shown in FIG. 1, and Experiment 6 was an experiment that carried out the pre-heating step S12 shown in FIG. 1 and then carried out the main heating step S13 shown in FIG. 1. Experiments 1, 3, and 5, which respectively correspond to Experiments 2, 4, and 6, did not carry out the microwave heating and left the solution at room temperature (R.T.). In each of FIGS. 4, 7, and 8, the experiments in which the microwave heating was carried out were indicated with the letters "(MW)", and the experiments in which the microwave heating was not carried out were indicated with the letters "(R.T.)".

In each of Experiments 2, 4, and 6, the value of the output from the heating device 10 was changed over time. Specifically, the value of the output was changed from 0 W to 600 W in 30 minutes and then was maintained at 600 W for 60 minutes. Thereafter, the value of the output was quickly decreased to 0 W.

In a case where the value of the output from the microwave oscillator 11 was changed according to the above-described pattern, the temperature of the container 14 kept increasing even after the value of the output reached 600 W, and the maximum temperature was approximately 220° C. as shown in FIG. 5. Such a change in temperature of the container 14 was common to the pre-heating step S12 in Experiment 2, the main heating step S13 in Experiment 4, and the pre-heating step S12 and the main heating step S13 in Experiment 6.

In Experiments 1 and 2, $NH_3$, NaOH, and KOH were employed as the solutes of the basic solution. In Experiments 3 and 4, HCl, $H_2SO_4$, and $HNO_3$ were employed as the solutes of the acidic solution. In Experiments 5 and 6, NaOH and KOH were employed as the solutes of the basic solution, and HCl, $H_2SO_4$, and $HNO_3$ were employed as the solutes of the acidic solution.

In Experiments 1 to 6, beryl, chrysoberyl, phenacite, and bertrandite were employed as the beryllium ores that are raw materials.

Referring to FIG. 6, in Experiment 6 in which beryl was employed as the raw material, NaOH was employed as the solute of the basic solution, and HCl was employed as the solute of the acidic solution, the following phenomenon was found. That is, as a result of the pre-heating step S12, plural recesses that did not exist before the pre-heating step S12 were formed on the surface of beryl. In addition, among the plural recesses, recesses other than those having existed before the pre-heating step S12 were found to have an opening whose shape (rectangular shape) reflecting a unit grid of crystal. It was also found that the surface roughness Ra of beryl increased from 0.93 μm to 21.48 μm as a result of the pre-heating step S12. Note that beryl used here was a block having a particle diameter of approximately 7 mm and having a polished surface.

As described above, it is found that carrying out the pre-heating step S12 on beryl, which is an example of the Be—Si—Al—O ore, can result in etching of the surface thereof, that is, corrosion, dissolution, collapse, and/or the like of the surface texture thereof.

FIG. 7 shows parts of the results of Experiments 1 to 6. An ICP mass spectrometer (ICP-MS) was used to analyze the amounts of the elements of Be, Al, and Si dissolved in the solution. The dissolved amounts shown in FIG. 7 indicate the proportions of the amounts of the elements having been dissolved with respect to the entire ore. That is, in a case where a certain element contained in an ore is completely dissolved, the solubility thereof is equal to the proportion of the element with respect to the ore.

The result of Experiment 1 revealed that, in the case where only the treatment that used the basic solution and that did not include the microwave heating was carried out, beryllium of any beryllium ore could not be dissolved sufficiently.

The result of Experiment 2 revealed that, in the case where the microwave heating and the treatment that used the basic solution were carried out in combination, beryllium of all kinds of beryllium ores was dissolved but the degree of dissolution was not sufficient.

The result of Experiment 3 revealed that, in the case where only the treatment that used the acidic solution and that did not include the microwave heating was carried out, beryllium of any beryllium ore could not be dissolved sufficiently.

The result of Experiment 4 revealed that, in the case where the microwave heating and the treatment that used the acidic solution were carried out in combination (i.e., in the case where only the main heating step S13 was carried out), beryllium of beryl containing Al could not be dissolved sufficiently, but beryllium of phenacite not containing contain Al could be dissolved sufficiently.

The result of Experiment 5 revealed that, in the case where the treatment that used the basic solution and that did not include the microwave heating was carried out and thereafter the treatment that used the acidic solution and that did not include the microwave heating was carried out, beryllium of any beryllium ore could not be dissolved sufficiently.

The result of Experiment 6 revealed that, in the case where the microwave heating and the treatment that used the basic solution were carried out in combination and thereafter the microwave heating and the treatment that used the acidic solution were carried out in combination (i.e., in the case where the pre-heating step S12 was carried out and thereafter the main heating step S13 was carried out), beryllium of even beryl containing Al could be dissolved sufficiently.

FIG. 7 does not show the results of Experiment 6 regarding phenacite not containing Al. In Experiment 6, however, beryllium of phenacite was dissolved sufficiently.

In Experiment 6, in the process for making a transition from the pre-heating step S12 to the main heating step S13, the polarity of the solution containing the beryllium ore was changed from basicity to acidity. At this time, a compound containing Si could be precipitated in the acidic solution. Consequently, Si could be removed from the solution. It is considered that the precipitation of the compound containing Si took place in the following manner. That is, as expressed by the following formulae, $Na_2SiO_3$ dissolved in the basic solution was turned into $H_2SiO_3$ in the acidic solution, and was deposited and precipitated. Note that $Na_2SiO_3$ is soluble in water, and $H_2SiO_3$ is insoluble in an acidic solution.

Pre-heating step S12: $SiO_2 + 2NaOH \rightarrow Na_2SiO_3 + H_2O$.

Main heating step S13: $Na_2SiO_3 + 2HCl \rightarrow H_2SiO_3 \downarrow + 2NaCl$.

FIG. 8 summarizes the results of Experiments 1 to 6. In FIG. 8, the X mark indicates that beryllium was not dissolved, the triangle indicates that beryllium was dissolved a little, the circle indicates that beryllium was dissolved almost completely, and the double circle indicates that beryllium was dissolved completely. In each of Experiments 1 to 6, the determination of the X mark, the triangle, the circle, or the double circle was made on the basis of comprehensive consideration of the analysis result obtained with the ICP mass spectrometer and the result of visual observation on the state of the solution after the experiment.

Referring to FIG. 8, it was found that, in the case where beryl or chrysoberyl was employed as the raw material, beryllium could be dissolved sufficiently by carrying out the pre-heating step S12 employing NaOH or KOH as the solute of the basic solution and then carrying out the main heating step S13 employing any of HCl, $H_2SO_4$, and $HNO_3$ as the solute of the acidic solution.

It was also found that, in the case where phenacite or bertrandite was employed as the raw material, beryllium could be dissolved sufficiently by carrying out the pre-heating step S12 employing NaOH or KOH as the solute of the basic solution and then carrying out the main heating step S13 employing any of HCl, $H_2SO_4$, and $HNO_3$ as the solute of the acidic solution.

Furthermore, it was found that, in the case where phenacite or bertrandite was used as the raw material, beryllium could be dissolved sufficiently by carrying out only the main heating step S13 employing HCl or $H_2SO_4$ as the solute of the acidic solution.

FIG. 9 shows a graph, related to phenacite in Experiment 4 and beryl in Experiment 6 shown in FIG. 4, indicating a correlation between the maximum temperature of the acidic solution and the solubility of beryllium observed when the main heating step S13 was carried out.

Among the three blocks of beryl B1 to B3 and the three blocks of phenacite P1 to P3 plotted in FIG. 9, the block of beryl B1 was subjected to the pre-heating step S12 and the main heating step S13 in both of which the value of the output from the microwave oscillator 11 was increased from 0 W to 300 W in 30 minutes, was maintained at 300 W for 60 minutes, and was then quickly decreased to 0 W. The block of phenacite P1 was subjected to the main heating step S13 in which the value of the output from the microwave oscillator 11 was increased from 0 W to 300 W in 30 minutes, was maintained at 300 W for 60 minutes, and was then quickly decreased to 0 W. The block of beryl B2 was subjected to the pre-heating step S12 and the main heating step S13 in both of which the value of the output from the microwave oscillator 11 was increased from 0 W to 600 W in 30 minutes, then was maintained at 600 W for 60 minutes, and then was quickly decreased to 0 W. The block of phenacite P2 was subjected to the main heating step S13 in which the value of the output from the microwave oscillator 11 was increased from 0 W to 600 W in 30 minutes, was maintained at 600 W for 60 minutes, and then was quickly decreased to 0 W. The block of beryl B3 was not subjected to the pre-heating step S12 or the main heating step S13, but was left in a basic solution at room temperature (R.T.=25° C.) for 60 minutes and then was left in an acidic solution for 60 minutes. The block of phenacite P3 was not subjected to the pre-heating step S12 or the main heating step S13, but was left in an acidic solution at room temperature (R.T.=25° C.) for 60 minutes.

For the block of phenacite P1 and the block of beryl B1, the maximum temperatures observed during the main heating step S13 were 180° C. and 190° C., respectively. For the block of phenacite P2 and the block of beryl B2, the maximum temperatures observed during the main heating step S13 were each 250° C. For the block of beryl B1 and the block of beryl B2, the maximum temperatures observed during the pre-heating step S12 are not illustrated, but were similar to those observed during the main heating step S13.

FIG. 9 shows that most of the block of beryl B3 and most of the block of phenacite P3 remained, that is, beryllium contained in these blocks of beryllium and phenacite was hardly dissolved as beryllium ions. Meanwhile, FIG. 9 shows that (1) in the case of the block of phenacite P1, 60% of beryllium was dissolved as beryllium ions, (2) in the case of the block of beryl B1, 50% of beryllium was dissolved as beryllium ions, and (3) in the cases of the block of phenacite P2 and the block of beryl B2, almost 100% of beryllium was dissolved as beryllium ions.

Results of Additional Experiments

In each of Experiments 1 to 6 described above, the proportion of the amount of each element having been dissolved with respect to the entire ore was obtained as the dissolved amount of the element (see FIG. 7), and the degree of dissolution of each element was determined to be the X mark, the triangle, the circle, or the double circle on the basis of comprehensive consideration of the analysis result obtained with the ICP mass spectrometer and the result of visual observation of the state of the solution after the experiment (see FIG. 8). Note that, as described above, Al in phenacite is considered to be derived from an impurity. Thus, in (a) of FIG. 10, the solubility of Al in phenacite was omitted.

The following description will discuss additional experiments. In the additional experiments, the above-described Experiments 1 to 6 were carried out again. That is, the amount of each of the elements dissolved in the HCl solution was analyzed with use of the ICP mass spectrometer, and then the proportion of the amount of each element having been dissolved with respect to the amount of the element contained in the ore was calculated to yield a solubility. That is, in a case where a certain element contained in the ore is completely dissolved, the solubility thereof is 100%.

The solubilities calculated in this manner are shown in (a) of FIG. 10. Note that the compositional ratio between Be, Al, and Si in beryl used in Experiments 1 to 6 was 3.1:6.3:20.0, whereas the compositional ratio between Be and Si in phenacite used in Experiments 1 to 6 was 15.2:22.0 (see (b) of FIG. 10).

Then, (1) if a solubility of not more than 10% was obtained, it was determined that the element was not dissolved (i.e., X); (2) if a solubility of more than 10% and not more than 50% was obtained, it was determined that the element was dissolved a little (i.e., triangle); (3) if a solubility of more than 50% and less than 100% was obtained, it was determined that the element was dissolved almost completely (i.e., circle); and (4) if a solubility of 100% was obtained, it was determined that the element was dissolved completely (i.e., double circle). The determination results obtained in this manner are shown in FIG. 11.

The result of Experiment 1 carried out as an additional experiment revealed that, in the case where only the treatment that used the basic solution and that did not include the microwave heating was carried out, beryllium of any beryllium ore could not be sufficiently dissolved.

The result of Experiment 2 carried out as an additional experiment revealed that, in the case where the microwave heating and the treatment that used the basic solution were carried out in combination, beryllium of all kinds of beryllium ores was dissolved a little but the degree of dissolution was not sufficient.

The result of Experiment 3 carried out as an additional experiment revealed that, in the case where only the treatment that used the acidic solution and that did not include the microwave heating was carried out, beryllium of any beryllium ore could not be dissolved or beryllium of the beryllium ores was dissolved insufficiently.

The result of Experiment 4 carried out as an additional experiment revealed that, in the case where the microwave heating and the treatment that used the acidic solution were carried out in combination (i.e., in the case where only the main heating step S13 was carried out), beryllium of beryl containing Al could not be dissolved sufficiently, but beryllium of phenacite not containing contain Al could be dissolved sufficiently.

The result of Experiment 5 carried out as an additional experiment revealed that, in the case where the treatment that used the basic solution and that did not include the microwave heating was carried out and thereafter the treatment that used the acidic solution and that did not include the microwave heating was carried out, beryllium of any beryllium ore could not be dissolved sufficiently.

The result of Experiment 6 carried out an additional experiment revealed that, in the case where the microwave heating and the treatment that used the basic solution were carried out in combination and thereafter the microwave heating and the treatment that used the acidic solution were carried out in combination (i.e., in the case where the pre-heating step S12 was carried out and thereafter the main heating step S13 was carried out), beryllium of even beryl containing Al could be dissolved sufficiently.

As described above, the results of Experiments 1 to 6 carried out as the additional experiments (see FIGS. 10 and 11) are consistent with the results of Experiments 1 to 6 (see FIGS. 7 and 8).

[Experiment Regarding First Impurity Removing Step]

In the production method M10 shown in FIG. 1, after the main heating step S13, the pH of the HCl solution was changed and the HCl solution whose pH was thus changed was subjected to the first impurity removing step S14. Then, the concentrations of beryllium and uranium remaining in the HCl solution were measured. In this experiment, tri-n-octylphosphine oxide (TOPO) was employed as the organic compound, and kerosene was employed as the organic solvent. That is, TOPO was dissolved in kerosene.

In this Example, after the main heating step S13, the pH of the HCl solution was changed. Consequently, plural kinds of HCl solutions having different pHs ranging from 1 to 7 were prepared. To each of the HCl solutions, kerosene containing TOPO dissolved therein was mixed and stirred. The resultants were left for a while. As a result, each of the HCl solutions mixed with kerosene containing TOPO dissolved therein was separated into two layers. After each of these solutions was separated into a water layer and an organic layer, the concentrations of beryllium and uranium in the water layer were measured.

As a result of the impurity removing step S14 carried out on the HCl solution whose pH had been adjusted to 7 after the main heating step S13, extraction of uranium into the organic layer was insufficient, and almost half of uranium remained in the water layer of the HCl solution. Furthermore, in this HCl solution, approximately 80% of beryllium was extracted into the organic layer. This reveals that it is not preferable to subject, to the impurity removing step S14, the HCl solution whose pH had been adjusted to 7 after the main heating step S13.

Meanwhile, as a result of the impurity removing step S14 carried out on the HCl solution whose pH had been adjusted to 2 or less after the main heating step S13, extraction of uranium into the organic layer was sufficient, and beryllium was not extracted into the organic layer. This reveals that an HCl solution to be subjected to the first impurity removing step S14 (i.e., an HCl solution that has undergone the main heating step S13) preferably has a pH of not more than 2.

[Experiment Regarding Anhydrization Step]

The anhydrization step S21 of the production method M20 shown in (a) of FIG. 2 was carried out. In this experiment, ammonium chloride was added to beryllium chloride hydrate, and the resulting beryllium chloride hydrate was heated in a vacuum at 90° C. for 24 hours. Consequently, the moisture content in the beryllium chloride could be made almost zero. That is, it was found that the above procedure could dehydrate the beryllium chloride to be anhydrous.

Aspects of the present invention can also be expressed as follows:

In order to attain the foregoing object, a method in accordance with a first aspect of the present invention for producing a beryllium solution includes a main heating step of dielectrically heating an acidic solution containing beryllium oxide to generate a beryllium solution.

By heating the acidic solution containing beryllium oxide through the dielectric heating, it is possible to dissolve the beryllium oxide in the acidic solution with higher energy efficiency than conventional. Thus, the production method in accordance with the first aspect can be provided as a novel production method with high energy efficiency.

A method in accordance with a second aspect of the present invention for producing a beryllium solution is configured such that, in the first aspect, the method includes a pre-heating step of dielectrically heating a basic solution containing beryllium oxide, the pre-heating step being carried out before the main heating step.

By carrying out the pre-heating step before the main heating step, it is possible to dissolve beryllium oxide, which is difficult to be dissolved when being subjected to the main heating step alone. Therefore, it is possible to produce a beryllium solution from a starting material selectable from a wider variety of beryllium oxides.

A method in accordance with a third aspect of the present invention for producing a beryllium solution is configured such that, in the first or second aspect, the method further includes: a first impurity removing step of removing, with use of an organic compound that adsorbs a first element, the first element from the beryllium solution obtained through the main heating step, the first impurity removing step being carried out after the main heating step.

By carrying out the first impurity removing step, it is possible to reduce the concentration of the first element contained in the beryllium solution. As a result, it is possible to reduce the concentration of the first element in the beryllium solution used to produce any of beryllium, beryllium hydroxide, and beryllium oxide. Examples of the first element encompass uranium, thorium, plutonium, and americium.

A method in accordance with a fourth aspect of the present invention for producing a beryllium solution is configured such that, in the third aspect, in the first impurity removing step, the organic compound is dissolved in an organic solvent, and the beryllium solution is acidic.

This configuration can enhance the efficiency at which the organic compound adsorbs the first element.

A method in accordance with a fifth aspect of the present invention for producing a beryllium solution is configured such that, in any of the first to fourth aspects, the method further includes a second impurity removing step of adjusting a polarity of the beryllium solution from acidity to basicity so as to remove a second element from the beryllium solution, the beryllium solution having been obtained through the main heating step, the second impurity removing step being carried out after the main heating step.

By carrying out the second impurity removing step, it is possible to reduce the concentration of the second element in the beryllium solution. As a result, it is possible to reduce the concentration of the second element contained in the beryllium solution used to produce any of beryllium, beryllium hydroxide, and beryllium oxide. Examples of the second element encompass aluminum and iron.

A method in accordance with a sixth aspect of the present invention for producing a beryllium solution is defined such that, in any of the first to fifth aspects, the main heating step dielectrically heats the acidic solution containing beryllium oxide by applying a microwave to the acidic solution.

The technique of the dielectric heating involving use of a microwave (i.e., microwave dielectric heating) is a technique used for so-called microwave ovens, that is, a widely-used technique. Thus, the production method in accordance with the sixth aspect can reduce the cost required to carry out the production method, as compared to conventional production methods.

A method in accordance with a seventh aspect of the present invention for producing a beryllium solution is defined such that, in any of the first to sixth aspects, the beryllium solution is a beryllium chloride solution.

With the production method in accordance with the seventh aspect, it is possible to easily produce the beryllium chloride solution while skipping the phase of beryllium hydroxide. From the beryllium chloride solution, it is possible to easily produce beryllium, beryllium hydroxide, and beryllium oxide, as will be described later. Therefore, the beryllium chloride solution is suitable as the beryllium solution.

A method in accordance with an eighth aspect of the present invention for producing beryllium includes: each step included in the method in accordance with any one of the first to sixth aspects for producing the beryllium solution; an anhydrization step of carrying out anhydrization of the beryllium solution so as to generate beryllium salt; and an electrolyzing step of carrying out molten salt electrolysis of the beryllium salt so as to generate beryllium.

A method in accordance with a tenth aspect of the present invention for producing beryllium hydroxide includes: each step included in the method in accordance with any one of the first to sixth aspects for producing the beryllium solution; and a neutralizing step of neutralizing, with a base, the beryllium solution so as to generate beryllium hydroxide.

A method in accordance with an eleventh aspect of the present invention for producing beryllium oxide includes: each step included in the method in accordance with any one of the first to sixth aspects for producing the beryllium solution; and a third heating step of heating the beryllium solution so as to generate beryllium oxide.

In accordance with these production methods, it is possible to produce beryllium, beryllium hydroxide, and beryllium oxide by a novel production method with high energy efficiency. With the method in accordance with the seventh aspect for producing beryllium, it is possible to produce, from the beryllium solution produced by the method in accordance with one aspect of the present invention for producing a beryllium solution, metal beryllium while skipping the phase of beryllium hydroxide. Currently, there are commercially available production methods for producing beryllium from a beryllium ore. According to the methods, beryllium hydroxide, which is highly demanded in general, is first produced from a beryllium ore, and then beryllium is produced from the beryllium hydroxide. Thus, the method in accordance with the seventh aspect for producing beryllium can produce beryllium in an easier manner, as compared to the currently commercially available methods for producing beryllium.

A method in accordance with a ninth aspect of the present invention for producing beryllium is configured such that, in the eighth aspect, the beryllium solution is a beryllium chloride solution, and the anhydrization step heats a beryllium chloride hydrate contained in the beryllium chloride solution in a vacuum at a temperature of not lower than 80° C. and not higher than 110° C.

With this configuration, in a case where the beryllium solution is a beryllium chloride solution, it is possible to reliably carry out an anhydrization treatment on a beryllium chloride hydrate.

Beryllium oxide in accordance with a twelfth aspect of the present invention includes: plural recesses formed on a surface of the beryllium oxide, the beryllium oxide having crystallinity, a part of or all of the plural recesses each having an opening whose shape reflects a shape of a unit grid of crystal.

Since beryllium oxide in accordance with the twelfth aspect has the surface provided with the plural recesses each having an opening whose shape reflects the shape of the unit grid of the crystal, the beryllium oxide would easily be dissolved in an acidic solution when being dielectrically heated in the acidic solution. Therefore, the beryllium oxide in accordance with one aspect of the present invention is suitable as a raw material from which a beryllium solution is to be produced.

Beryllium oxide in accordance with a thirteenth aspect of the present invention is further configured such that, in the twelfth aspect, the beryllium oxide further includes silicon and aluminum.

Beryllium oxide containing silicon and aluminum is difficult to be dissolved even by dielectrically heating the beryllium oxide in an acidic solution. However, with plural recesses formed on beryllium oxide containing silicon and aluminum, the beryllium oxide can be dissolved in an acidic solution by dielectrically heating the beryllium oxide in the acidic solution.

Note that beryllium solutions containing beryllium oxides in accordance with the twelfth and thirteenth aspects and a beryllium ion are also aspects of the present invention.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

M10: Production method (method for producing beryllium solution, method for producing $BeCl_2$ solution)
S11: Grinding step
S12: Pre-heating step
S13: Main heating step
S14, S15: First, second impurity removing steps
M20, M30, M40: Methods for producing beryllium, beryllium hydroxide, and beryllium oxide
S21: Anhydrization step S22: Electrolyzing step
S31: Neutralizing step
S41: Heating step

The invention claimed is:

1. A method for producing a beryllium solution, comprising:
a main heating step of dielectrically heating an acidic solution containing beryllium oxide to generate a beryllium solution,
wherein the method further comprises a pre-heating step of dielectrically heating a basic solution containing beryllium oxide, the pre-heating step being carried out before the main heating step.

2. The method as set forth in claim 1, further comprising:
a first impurity removing step of removing, with use of an organic compound that adsorbs a first element, the first element from the beryllium solution obtained through the main heating step, the first impurity removing step being carried out after the main heating step.

3. The method as set forth in claim 2, wherein
in the first impurity removing step,
the organic compound is dissolved in an organic solvent, and
the beryllium solution is acidic.

4. The method as set forth in claim 1, further comprising:
a second impurity removing step of adjusting a polarity of the beryllium solution from acidity to basicity so as to remove a second element from the beryllium solution, the beryllium solution having been obtained through the main heating step, the second impurity removing step being carried out after the main heating step.

5. The method as set forth in claim 1, wherein
the main heating step dielectrically heats the acidic solution containing beryllium oxide by applying a microwave to the acidic solution.

6. The method as set forth in claim 1, wherein
the beryllium solution is a beryllium chloride solution.

7. A method for producing beryllium, comprising:
each step included in the method recited in claim 1;
an anhydrization step of carrying out anhydrization of the beryllium solution so as to generate beryllium salt; and
an electrolyzing step of carrying out molten salt electrolysis of the beryllium salt so as to generate beryllium.

8. The method as set forth in claim 7, wherein
the beryllium solution is a beryllium chloride solution, and
the anhydrization step heats beryllium chloride hydrate contained in the beryllium chloride solution in a vacuum at a temperature of not lower than 80° C. and not higher than 110° C.

9. A method for producing beryllium hydroxide, comprising:
each step included in the method recited in claim 1; and
a neutralizing step of neutralizing, with a base, the beryllium solution so as to generate beryllium hydroxide.

10. A method for producing beryllium oxide, comprising:
each step included in the method recited in claim 1; and
a third heating step of heating the beryllium solution so as to generate beryllium oxide.

* * * * *